(12) United States Patent
Taminger et al.

(10) Patent No.: US 7,168,935 B1
(45) Date of Patent: Jan. 30, 2007

(54) SOLID FREEFORM FABRICATION APPARATUS AND METHODS

(75) Inventors: Karen M. Taminger, Yorktown, VA (US); J. Kevin Watson, Houston, TX (US); Robert A. Hafley, Yorktown, VA (US); Daniel D. Petersen, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 425 days.

(21) Appl. No.: 10/637,086

(22) Filed: Aug. 1, 2003

Related U.S. Application Data (60) Provisional application No. 60/401,190, filed on Aug. 2, 2002.

(51) Int. Cl.
*B28B 17/00* (2006.01)
*B29C 35/04* (2006.01)
*B23K 15/00* (2006.01)

(52) U.S. Cl. .................. 425/174.4; 425/DIG. 60; 264/401; 264/402; 264/403; 264/404; 264/405; 264/406; 264/407; 264/408; 264/409; 264/410; 264/411; 264/412; 264/497; 219/121.12; 219/121.15; 219/121.64; 219/121.63; 219/121.65; 219/121.16; 219/121.21; 219/121.86

(58) Field of Classification Search ............. 425/174.4, 425/DIG. 60; 264/401, 402–412, 497; 219/121.12, 219/121.15, 121.64, 121.63, 121.65, 121.16, 219/121.21, 121.86
See application file for complete search history.

(56) References Cited

U.S. PATENT DOCUMENTS

| | | | |
|---|---|---|---|
| 3,971,860 A | 7/1976 | Broers et al. | |
| 4,264,641 A * | 4/1981 | Mahoney et al. | 427/483 |
| 4,762,975 A * | 8/1988 | Mahoney et al. | 219/69.1 |
| 5,306,447 A * | 4/1994 | Marcus et al. | 264/497 |
| 5,460,758 A * | 10/1995 | Langer et al. | 264/401 |
| 5,578,227 A * | 11/1996 | Rabinovich | 219/121.63 |
| 5,622,216 A | 4/1997 | Brown | |
| 5,669,433 A * | 9/1997 | Sterett et al. | 164/46 |
| 5,697,043 A | 12/1997 | Baskaran et al. | |
| 5,718,951 A * | 2/1998 | Sterett et al. | 427/466 |
| 5,738,817 A | 4/1998 | Danforth et al. | |
| 5,745,834 A | 4/1998 | Bampton et al. | |
| 5,746,844 A * | 5/1998 | Sterett et al. | 148/522 |
| 5,775,402 A | 7/1998 | Sachs et al. | |
| 5,786,023 A | 7/1998 | Maxwell et al. | |
| 5,786,562 A | 7/1998 | Larson | |
| 5,787,965 A | 8/1998 | Sterett et al. | |

(Continued)

OTHER PUBLICATIONS

Electron Beam Welding, Chapter 21, p. 676-678, May 10, 2006.

*Primary Examiner*—Robert Davis
*Assistant Examiner*—G. Nagesh Rao
(74) *Attorney, Agent, or Firm*—Theodore U. Ro (57) ABSTRACT

An apparatus for formation of a three dimensional object comprising a sealed container; an electron beam subsystem capable of directing energy within said container; a positioning subsystem contained within said container; a wire feed subsystem contained within said container; an instrumentation subsystem electronically connected to said electron beam subsystem, positioning subsystem, and wire feed subsystem; and a power distribution subsystem electrically connected to said electron beam subsystem, positioning subsystem, wire feed subsystem, and said instrumentation subsystem.

38 Claims, 3 Drawing Sheets

U.S. PATENT DOCUMENTS

| | | | |
|---|---|---|---|
| 5,849,238 A | 12/1998 | Schmidt et al. | |
| 5,893,404 A | 4/1999 | Mendez et al. | |
| 5,960,853 A * | 10/1999 | Sterett et al. | 164/271 |
| 6,149,072 A | 11/2000 | Tseng | |
| 6,180,049 B1 | 1/2001 | Jang et al. | |
| 6,214,279 B1 | 4/2001 | Yang et al. | |
| 6,228,437 B1 | 5/2001 | Schmidt | |
| 6,251,340 B1 | 6/2001 | Tseng | |
| 6,268,584 B1 | 7/2001 | Keicher et al. | |
| 6,306,467 B1 | 10/2001 | White et al. | |
| 6,316,153 B1 | 11/2001 | Goodman et al. | |
| 6,376,148 B1 | 4/2002 | Liu et al. | |
| 6,401,001 B1 | 6/2002 | Jang et al. | |
| 6,405,095 B1 | 6/2002 | Jang et al. | |
| 6,409,902 B1 | 6/2002 | Yang et al. | |
| 6,441,338 B1 * | 8/2002 | Rabinovich | 219/121.64 |
| 6,471,800 B2 | 10/2002 | Jang et al. | |
| 6,780,368 B2 * | 8/2004 | Liu et al. | 264/401 |
| 2002/0149137 A1 | 10/2002 | Jang et al. | |
| 2002/0195747 A1 | 12/2002 | Hull et al. | |
| 2003/0063138 A1 | 4/2003 | Varnon et al. | |
| 2003/0067098 A1 | 4/2003 | Newell et al. | |
| 2003/0075836 A1 | 4/2003 | Fong | |

* cited by examiner

SOLID FREEFORM FABRICATION APPARATUS AND METHODS

This nonprovisional application claims the benefit of provisional U.S. patent application Ser. No. 60/401,190, filed on Aug. 2, 2002.

GOVERNMENT INTERESTS

Origin of the Apparatus

The apparatus and methods for use described herein were made by employee(s) under contract with the United States Government and may be manufactured and used by or for the Government of the United States of America for governmental purposes without the payment of any royalties thereon or therefor.

BACKGROUND

The present invention relates generally to solid freeform fabrication of objects and, more specifically, to solid freeform fabrication of objects employing electron beam energy.

The basic problem was the lack of a portable, low mass, low power apparatus capable of three-dimensional replacement part fabrication, especially as it applies to remote locations where spare parts are not logistically available. Applications include use for on-site part and tool fabrication for sea-faring ships, oil rigs, mobile military or exploration units, lab-scale systems for research and development environments, and isolated settlements.

Production of replacement components by solid freeform fabrication processes during an extended duration mission or in remote locations could reduce or eliminate the need to carry a complete inventory of pre-manufactured spares. For example, future long-duration human space exploration missions will be challenged by constraints on mass and volume allocations available for spare parts. Addressing this challenge is critical to the success of these missions. As a result, it is continually necessary to consider new approaches to spacecraft maintenance and repair that minimize the mass and stowage volume that must be allocated for spares while enhancing mission robustness. For example, rather than having to stow numerous spares, replacement components would be generated as needed from feedstock material. As a result, only the total mass of replacements would need to be estimated instead of a prediction of which specific components might be required. Attempting to predict which components will fail and require replacement is inherently an inaccurate process and will certainly result in provisioning numerous components that will never be used (wasted mass and wasted volume) and may result in under-provisioning of other components. This technology could also be used to support fabrication of large structures and repair of primary structures as well as structural and mechanical components.

Direct deposition processes utilizing electron beam energy sources offer the greatest potential for remote applications. Conventional electron beam welding operating in the range of about 60 kV accelerating voltage generates sufficient radiation to pose a serious potential health risk to personnel. This hazard is controlled by incorporating sufficient shielding in the walls and windows of the sealed container. Clearly, massive shielding would be counter to the objective of developing a lightweight, portable system. Further, the mass associated with this shielding would be a very undesirable characteristic for an operational system to be used onboard spacecraft. Since heavy shielding is undesirable in this application, the alternative approach is to design the process in such a way that production of hazardous penetrating radiation is avoided. This can be accomplished by operating at significantly lower accelerating voltages than are typically used for industrial electron beam welding. Operation in the range from about 8 to about 15 kV will minimize production of penetrating radiation. Shielding provided by a simple stainless steel or aluminum sealed container should be adequate to ensure the safety of operating personnel.

Although the feedstock material can be introduced as either a powder or wire, the wire form is preferable for both terrestrial and interplanetary applications. Specifically, for interplanetary space applications, wire feedstock is preferable due to operational and safety issues associated with management of metallic powder in a microgravity environment. However, powder form feedstock is feasible for terrestrial applications.

Because of superior energy conversion efficiency compared with laser systems, electron beam technology is the preferred means.

The present apparatus and method for use described herein can be utilized in a very rapid and economic fashion to produce, for example, tools, parts, products, or molds per a user's production requirements. The present apparatus and method for use attempts to overcome the aforementioned problems and challenges.

SUMMARY

A portable, low power, solid freeform fabrication apparatus and method for use is presented utilizing an electron beam energy source and wire feedstock as an embodiment. A solid freeform fabrication apparatus is a device that fabricates three-dimensional structural components, objects, and parts from a feedstock material using input data, typically from computer aided design (CAD) data. In a solid freeform fabrication system, a finished part "materializes" by the deposition of layers of material on a substrate wherein the part's "blueprint" is stored in a computer design file. Liquid plastic, ceramic, or metal is deposited, photopolymerized, melted, or sintered to shape the part as directed by a succession of minutely thin cross-sections of the design file. In solid freeform fabrication, there is no interference between any tool used and the part, as opposed to metal cutting, forging or sheet forming methods. No die or mold is required, which can result in enormous cost and time savings. The solid freeform fabrication apparatus described herein is substantially self-contained wherein attributes for this system are low volume, low mass, efficiency in use of feedstock material, energy efficiency, and safety. In one embodiment, the solid freeform fabrication apparatus comprises a sealed container, an electron beam subsystem (e.g., an electron beam gun and associated peripherals described in more detail later), a positioning subsystem, a feedstock supply subsystem, mounting means, a controlled atmosphere or vacuum subsystem, instrumentation subsystem, and a power distribution subsystem. The use of a low-voltage electron beam energy source will reduce radiation so that massive shielding is not required to protect adjacent operators and other personnel. In an embodiment, feedstock efficiency will be optimized by use of metal wire, and energy use efficiency will be achieved by use of a low voltage electron beam energy source in a vacuum environment. The solid freeform fabrication apparatus provides the capability to introduce feedstock material such as metal wire into a molten pool created by a focused electron beam and ultimately results in the accurate fabrication of three-dimensional structural parts. The parts are created onto a target or platform. In one embodiment, the structural parts are fabricated by controlled deposition of the feedstock material wherein the control is realized by utilizing CAD data and a computer-based system.

DESCRIPTION

DETAILED DESCRIPTION

A solid freeform fabrication apparatus and methods for use will now be described more fully hereinafter with reference to the accompanying drawings, in which embodiments of a solid freeform fabrication apparatus are shown. The solid freeform fabrication apparatus may, however, be embodied in many different forms and should not be construed as limited to the embodiments set forth herein; rather, these embodiments are provided so that this disclosure will be thorough, complete, and will fully convey the scope of the solid freeform fabrication apparatus to those skilled in the art. Like numbers refer to like elements throughout.

The term "about" as used herein may be applied to modify any quantitative representation that could permissibly vary without resulting in a change in the basic function to which it is related. For example, a voltage as disclosed herein may permissibly be different than the precise value if the basic function to which the voltage is related does not change. For the purposes herein, the term "electronically" or any form thereof is defined as of, implemented on, controlled, or any combination by a computer, a computer network, or any combination. Further, "electronically connected" is accomplished by wires, electromagnetic waves (e.g., wireless), or both. For the purposes herein, the term "computer system" or any form thereof is defined as any device that receives input data, processes the input data such as on a microprocessor, and displays results on a screen (for example, a CRT, LCD, liquid crystal on silicon, flat screen, or similar). Examples of computer systems include a desktop PC, laptop PC, PDA, workstation, minicomputer, and customized device. All typical peripherals are also included (i.e., keyboard, mouse, hard drive(s), CD drive(s), DVD drive(s), other external drive(s), speakers, etc).

Referring now to the drawings, various embodiments of the apparatus and methods for use for forming a three-dimensional article will be described in detail.

Figure 1:
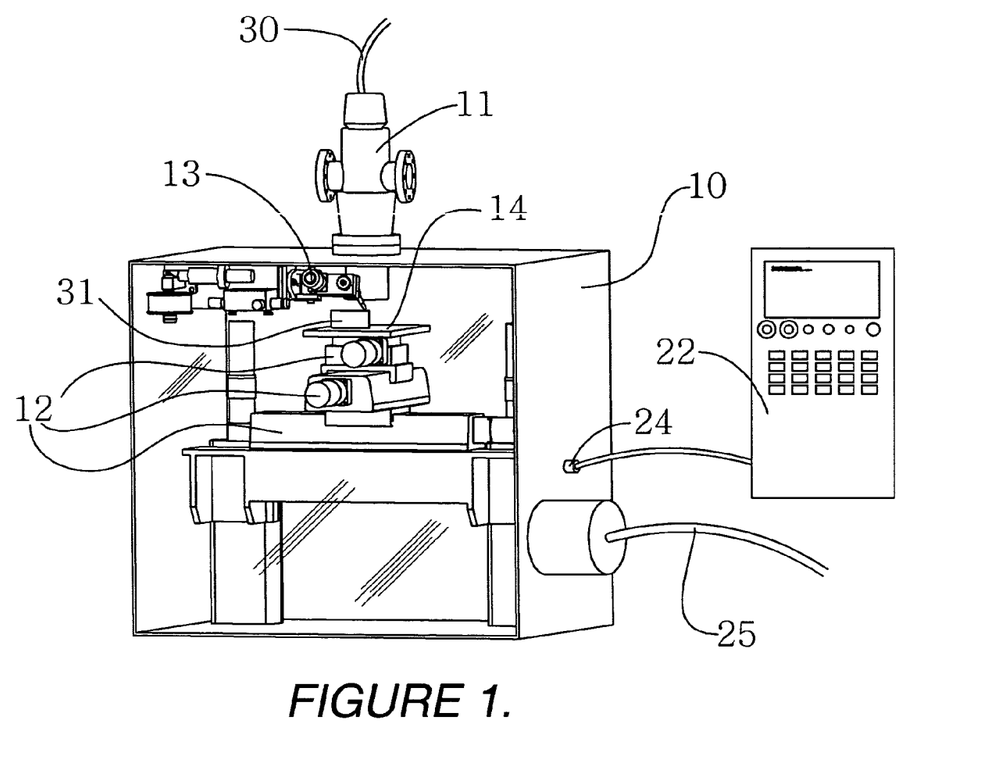
FIG. 1. is a perspective view of an embodiment of a solid freeform fabrication apparatus.
Figure 2:
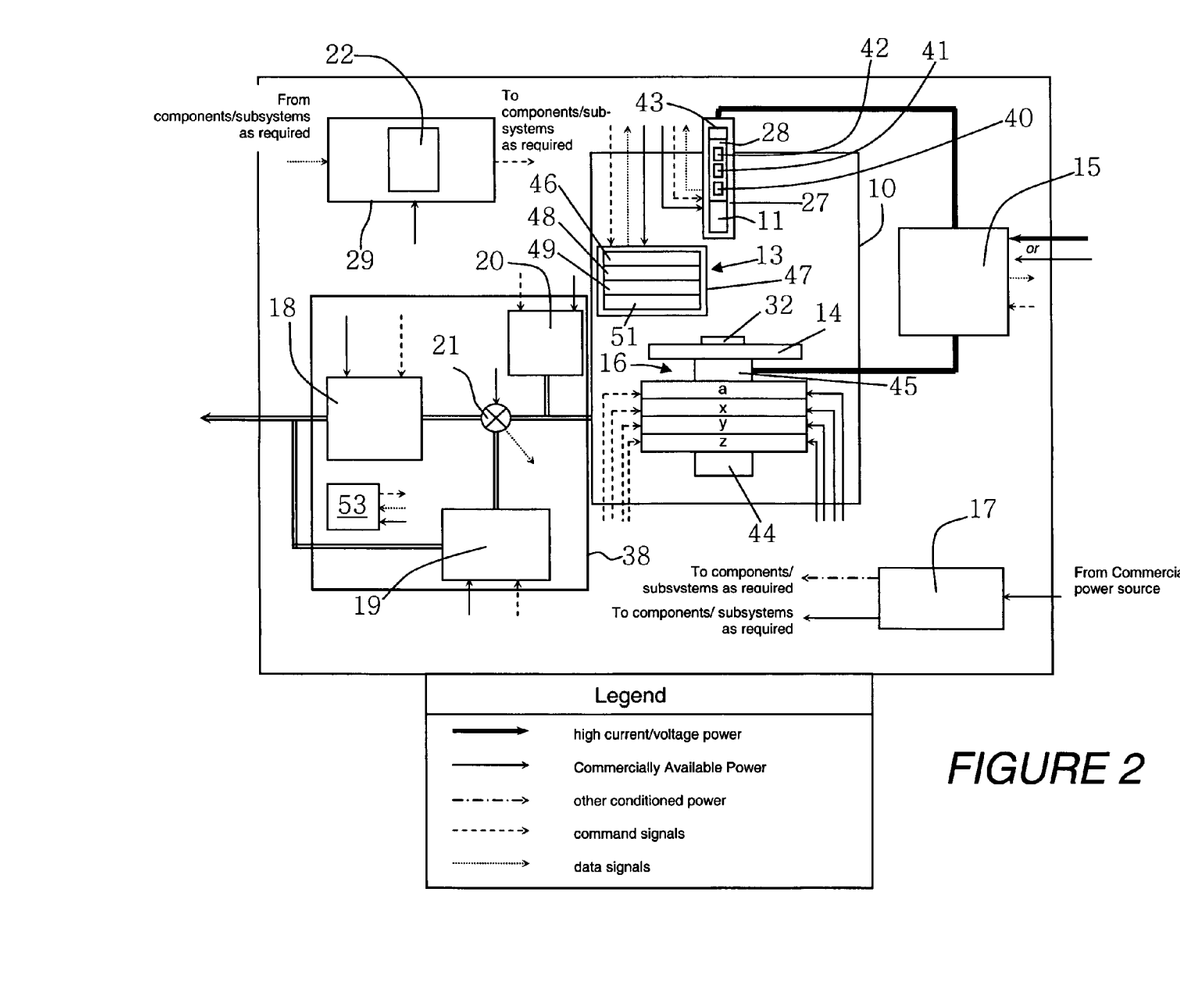
FIG. 2. a schematic diagram of an embodiment of a solid freeform fabrication apparatus.
Figure 3:
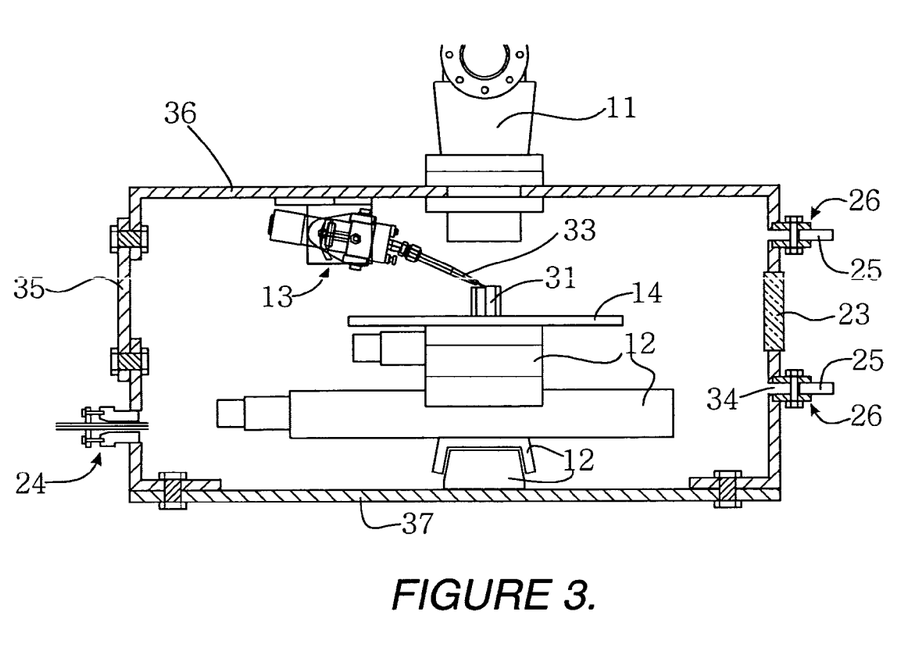
FIG. 3. is a partial cross sectional view of an embodiment of a solid freeform fabrication apparatus.

FIG. 1 shows an embodiment of the solid freeform fabrication apparatus, which includes a sealed container 10 capable of maintaining a vacuum environment, an electron beam gun 11, a multi-axes positioning subsystem 12, a wire feed subsystem 13, and a moveable platform 14 wherein the apparatus fabricates a three-dimensional object 31. FIG. 2 is a schematic diagram of an embodiment of the solid freeform fabrication apparatus, which includes an electron beam gun 11 and an electron beam power supply 15, a wire feed subsystem 13, a four-axes positioning subsystem 16, a power distribution subsystem 17, a vacuum subsystem (comprising a turbomolecuar pump 18, a scroll pump 19, ion pump 20, ducts (not shown), and a valve 21), and a computer system 22 which is part of an instrumentation subsystem. The scroll pump 19 provides a rough vacuum and also serves as a backing pump for the turbomolecular pump 18. With continued reference to FIGS. 1 and 2, the major components that are contained within the sealed container 10 include the electron beam gun 11, multi-axes positioning subsystem 12, and wire feed subsystem 13. In an embodiment, most of the electron beam gun 11 is external to the sealed container 10, as illustrated in FIG. 1. A portion of the electron beam gun column is inserted into the container to bring the focal point of the beam close to a substrate 32 and allow room at the top of the container for mounting the wire feed subsystem 13. The substrate 32 is used as a building block to begin the fabrication of a three-dimensional object 31. In an embodiment, the electron beam gun 11 and a wire feed subsystem 13 are mounted directly to the top portion of the sealed container 10. In an embodiment, the multi-axes positioning subsystem 12 and ports for the vacuum subsystem are mounted to a descendible base (not shown) to provide full access to the interior of the container when not under vacuum. In an embodiment, mounting brackets (not shown) are precision aligned to maintain the proper orientation of the electron beam gun 11 and wire feed subsystem 13 with respect to the zero coordinates in the multi-axes positioning subsystem 12.

With reference to FIG. 3, in an embodiment, at least one door 35 is included in the sealed container frame 36 in addition to the descendible base (not shown) to reduce the amount of space required to fully access the interior of the sealed container when not under vacuum without disturbing the precision alignment of the electron beam gun 11, wire feed subsystem 13, and multi-axes positioning subsystem 12. In an embodiment, the sealed container and all support hardware may be rack-mounted (not shown). To provide portability, the subsystems described above are structurally mounted to support frames (not shown) that provide a means for carrying the subsystems by operating personnel.

With continued reference to FIG. 3, as stated earlier, the sealed container is capable of maintaining a vacuum environment within the container. In one embodiment, the sealed container is comprised of a frame 36 and at least one wall 37 attached to said frame. In one embodiment, the frame 36 and at least one wall 37 is formed of metal. In a second embodiment, the frame 36 and at least one wall 37 is comprised of a material selected from the group consisting of metal, metal alloy, ceramic, ceramic composite, metal matrix composites, and polymer matrix composites. In a third embodiment, the frame 36 and at least one wall 37 comprises a material selected from the group consisting of titanium, aluminum, aluminum alloys, beryllium alloys and stainless steel for radiation protection and structural integrity. In an embodiment, the sealed container incorporates at least one window 23 for operator visibility as well as monitoring by cameras or a video system. The at least one window 23 is formed of a transparent material. In an embodiment, the transparent material may comprise a material selected from the group consisting of leaded glass, glass, and transparent plastic. In a second embodiment, the sealed container incorporates at least one door 35 attached to the frame 36 or at least one wall 37 to allow full access to the interior of the sealed container when not under vacuum. In a third embodiment, the sealed container incorporates at least one electrical feed-through 24 for connecting sensors (not shown) and motors inside the sealed container with instrumentation (such as a computer system) located outside the sealed container.

In one embodiment, a sealed container comprises a frame and at least one enclosing wall. In a second embodiment, a sealed container comprises a frame, at least one enclosing wall, and at least one window. In a third embodiment, a sealed container comprises a frame, at least one enclosing wall, at least one window, and at least one door. In a fourth embodiment, a sealed container comprises a frame, at least one wall, at least one window, at least one door, at least one electrical feed-through, or any combination.

The geometry of the sealed container depends on the specific requirements for the end-use of the apparatus. In FIG. 1, the sealed container 10 has a rectilinear cross-sectional shape. In addition, the sealed container may have an ellipsoidal or any arbitrary cross-sectional shape.

A sealed container is one containment means for enclosing a workspace. A sealed container formed of metal with at least one window formed of transparent material is a second containment means for enclosing a workspace. A sealed container with at least one window is a third containment means for enclosing a workspace. A sealed container comprised of a frame, at least one wall, at least one window, at least one door, at least one electrical feed-through, or any combination is a fourth containment means for enclosing a workspace.

With continued reference to FIG. 2, the electron beam subsystem 27 is comprised of an electron beam gun 11; an electron beam control element 28 which is one means for controlling and managing the electron beam emitted from the electron beam gun 11 and wherein the electron beam control element is electronically connected to the electron beam gun 11 and a computer system 22, which is a component of an instrumentation subsystem 29; at least one focusing coil (not shown); at least one deflection coil (not shown); an electron beam power supply 15 electrically connected to a power distribution subsystem 17, the electron beam gun 11, the electron beam control element, the at least one focusing coil, and the at least one deflection coil; or any combination. Further, the focusing and deflection coils may be integrated into the electronic beam gun 11. In an embodiment, the electron beam subsystem further comprises an auxiliary vacuum pump 40, a service panel 41, outputs and inputs (not shown), a user interface screen 42, or any combination. In an embodiment, the electron beam gun 11 generates a focusable electron beam with a low accelerating voltage (below about 15 kV) and with a maximum beam power in the range of from about 3 to about 5 kW and operates using about 110 V input power. However, any commercially available power source, wherein the current global voltage range is from about 100V to about 240V, can be used. This embodiment provides sufficient power density for the electron beam freeform fabrication process and still meets safety considerations for radiation shielding. However, optional maximum beam power ranges (up to about 10 kW) as well as optional accelerating voltages (from about 15 kV to about 60 kV) may be used. In an embodiment, the electron beam gun is compact in size and operates using the vacuum from the process environment, thereby eliminating the requirement for auxiliary vacuum pumping of the electron beam gun. However, in one embodiment, the electron beam gun further comprises an auxiliary vacuum pump 40. The electron beam subsystem is designed for an electrically conductive path to ground the system. Furthermore, in an embodiment, the electron beam subsystem further comprises an enhanced capability by adding the ability to move the electron beam gun using translation in X, Y, Z, tilt in the X-Z or Y-Z planes, or rotation (not shown). This option allows greater flexibility, better efficiency of space utilization within the sealed container 10, and greater complexity of parts that can be built. This ability to move the electron beam gun will require an electron beam positioning subsystem 43 comprised of at least one electron beam gun motor (not shown), at least one electron beam gun position sensor (not shown), and a programmable motor control element (not shown) attached to the electron beam gun to affect the mobility of the electron beam gun. In one embodiment, the programmable motor control element is integrated with the electron beam control element. In another embodiment, the programmable motor control element is independent to the electron beam control element.

With continued reference to FIGS. 1, 2 and 3, in an embodiment, the electron beam gun 11 is structurally attached to the sealed container 10—with a portion of the electron beam gun protruding into the sealed container 10 and a portion of the electron beam gun extending outside of the sealed container 10. The electron beam gun 11 is connected via a high voltage power cable 30 to a high voltage electron beam power supply 15. The high voltage power supply 15, in turn, is connected to the available utility power via an appropriately sized electrical cable (not shown). Low-voltage power required to control the focusing and deflecting coils (not shown) is provided either from the power distribution subsystem 17 or is incorporated into the design of the electron beam power supply 15. This low voltage power may be supplied via discrete power lines and electrical feed-throughs 24 that penetrate the wall of the sealed container 10 or via conductors (not shown) that are integrated into the electron beam gun 11.

An electron beam deposition process in a vacuum is preferred to prevent attenuation of the electron beam and ionization of gases in the process environment. Working in a vacuum also provides a clean atmosphere to prevent contamination of the metal during the deposition process. In another embodiment, the electron beam deposition process is not performed in a vacuum and thus, no vacuum subsystem is included in the solid freeform fabrication apparatus. With continued reference to FIGS. 1, 2, and 3, in an embodiment, the preferred vacuum level is about $10^{-4}$ torr to about $10^{-6}$ torr for proper operation of the electron beam gun 11. In an embodiment, the vacuum subsystem 38 is comprised of at least one pump (for example, at least one scroll pump 19, at least one turbomolecular pump 18, at least one ion pump 20, or any combination) wherein the at least one pump is interconnected to the sealed container 10 and to each other by at least one duct 25 and at least one valve 21. Further, in an embodiment, at least one vacuum subsystem sensor (not shown) is installed at predetermined locations in regards to the pumps, ducts, valves, or any combination. In still a further embodiment, at least one filter is installed at predetermined locations in regards to the pumps, ducts, valves, or any combination. In an embodiment, the at least one pump and at least one valve are electronically connected to a vacuum subsystem control element 53 that records and processes sensor data as well as controls the at least one pump and valve. In an embodiment, the vacuum subsystem control element is comprised of at least one vacuum subsystem sensor (not shown) electronically connected to the instrumentation subsystem (discussed later) and electrically connected to the power distribution subsystem. In another embodiment, the vacuum subsystem control element 53 further comprises a microprocessor (not shown) electronically connected to the at least one sensor and to the instrumentation subsystem as well as electrically connected to the power distribution subsystem. In an embodiment, the vacuum subsystem control element 53 further comprises a circuit board (not shown) and firmware (not shown), wherein both elements are electronically connected to the at least one sensor and to the instrumentation subsystem as well as electrically connected to the power distribution subsystem. In an embodiment, at least one scroll pump 19 achieves a rough vacuum, and serves as a backing pump for at least one turbomolecular pump 18. In a second embodiment, at least one low vacuum pump is used to achieve a rough vacuum. In a third embodiment, at least one roughing pump is used to achieve a rough vacuum. In one embodiment, at about 1 torr, the at least one turbomolecular pump 18 switches on to evacuate quickly down to about $10^{-6}$ torr. In a second embodiment, at about 1 torr, at least one high vacuum pump is used to evacuate quickly down to about $10^{-6}$ torr. In a third embodiment, at about 1 torr, at least one cryopump is used to evacuate quickly down to about $10^{-6}$ torr. In a fourth embodiment, at about 1 torr, at least one diffusion pump is used to evacuate quickly down to about $10^{-6}$ torr. In one embodiment, once the sealed container 10 reaches about $10^{-6}$ torr, the at least one valve 21 to the at least one turbomolecular pump 18 closes and the at least one turbomolecular pump 18 shuts off to protect the high speed rotating vanes from damage that may occur due to sudden loading or changes in various forces on the at least one turbomolecular pump 18. The at least one ion pump 20 is activated to maintain high vacuum and to remove any outgassing or metal vapor resulting from the fabrication process. In a second embodiment, there is no ion pump and the at least one turbomolecular pump 18 remains on after evacuation to about $10^{-6}$ torr. In an embodiment, the at least one turbomolecular pump is equipped with contactless electromagnetic bearings with its own feedback control to help protect from damaging the at least one turbomolecular pump due to changes in forces or irregular loading conditions. In an embodiment, a further precautionary measure includes mounting all pumps with shock suppression (not shown) to protect all pumps from damage due to irregular loading conditions.

With continued reference to FIGS. 1, 2, and 3, in an embodiment, at least one duct 25 is connected to the sealed container 10 by at least one bolted flange 26. The at least one bolted flange 26 is used in combination with at least one plumbing feed-through 34 to provide a means for attaching the vacuum subsystem to the sealed container 10. Other elements of the vacuum subsystem are connected to each other either directly or with ducting. At least one duct may be used as a vent for outgassing purposes. Structural connection between these vacuum subsystem elements are implemented by bolted flanges or other prior art means. Power is provided via power cables (not shown) from the power distribution subsystem 17 for operation of vacuum pump subsystem motors (not shown), which are subcomponents of the vacuum pumps included in the vacuum subsystem. At least one valve 21 may be operated either manually or via electrically driven actuators (not shown). An actuator is an example of a vacuum subsystem sensor. In the latter event, power for operation of the electrically driven actuators is provided via power cables from the power distribution subsystem.

For interplanetary space applications, it is contemplated that the equipment can be designed and operated to use the vacuum of outer space as a process environment for the fabrication process. The processing equipment might either be located such that it can be fully exposed to the outer space environment or located in a working container that is vented overboard. In either case, use of the high vacuum readily available in outer space will significantly simplify the fabrication system design by eliminating the vacuum subsystem.

At least one scroll pump is an atmospheric pressure control means for creating and maintaining a vacuum environment inside the containment means. At least one turbomolecular pump is a second atmospheric pressure control means for creating and maintaining a vacuum environment inside the containment means. At least one ion pump is a third atmospheric pressure control means for creating and maintaining a vacuum environment inside the containment means. At least one roughing pump is a fourth atmospheric pressure control means for creating and maintaining a vacuum environment inside the containment means. At least one cryopump is a fifth atmospheric pressure control means for creating and maintaining a vacuum environment inside the containment means. At least one diffusion pump is a sixth atmospheric pressure control means for creating and maintaining a vacuum environment inside the containment means. At least one low vacuum pump is a seventh atmospheric pressure control means for creating and maintaining a vacuum environment inside the containment means. At least one high vacuum pump is an eighth atmospheric pressure control means for creating and maintaining a vacuum environment inside the containment means.

In an embodiment, a positioning subsystem moves the substrate 32 while allowing the electron beam to remain stationary. With continued reference to FIGS. 1, 2, and 3, in an embodiment, the multi-axes positioning subsystem 12 is comprised of a movable platform 14, a positioning subsystem control element 44, at least one positioning subsystem sensor (for example, rate and location sensors) (not shown), at least one positioning subsystem motor 45, means for providing electrical continuity (for example, a grounding element) (not shown), means for providing thermal and electrical isolation (for example, insulators) (not shown), means for providing protective shielding (not shown), and means for clamping a base plate in place (not shown). The multi-axes positioning subsystem 12 is powered by and electrically connected to the power distribution subsystem 17. As illustrated in FIG. 2, in one embodiment, the positioning subsystem has four axes: X, Y, and Z linear axes, plus a-axis rotation in the X-Y plane. The four-axes positioning subsystem 16, which is a specific embodiment of a multi-axes positioning subsystem, allows sufficient flexibility for more detailed process development and the ability to produce complex parts. In a second embodiment, a five-axes positioning subsystem (not shown) that includes a tilt capability, which tilts the platform in either the X-Z or Y-Z plane is used. In one embodiment, the positioning subsystem control element 44 is comprised of at least one positioning subsystem sensor (not shown) electronically connected to the instrumentation subsystem. The positioning subsystem control element is electrically connected to the power distribution subsystem 17. In another embodiment, the positioning subsystem control element is further comprised of a microprocessor (not shown). In still another embodiment, the positioning subsystem control element is further comprised of a circuit board and firmware (not shown). The electron beam freeform fabrication process typically orients the electron beam vector normal to the surface on which the deposit is being built. This tilt capability enables positioning of the substrate 32 at different angles from 0° (platform normal is parallel to the electron beam vector) to 90° (platform normal is perpendicular to the electron beam vector) to allow enhanced flexibility and capability to build complex geometries and overhangs.

In an embodiment, the positioning subsystem is designed for the electron beam freeform fabrication process. The precision and accuracy of the positioning subsystem are specified to be about +/−0.001 inch for each linear axis of X, Y, and Z, and about +/−0.01 degrees for the a-axis rotation in the X-Y plane, which are designed to be smaller than the radius of the molten pool. The translation speed ranges are from about 0 to about 50 inches per minute for each linear axis of X, Y, and Z, and from about 0 to about 10 rotations per minute for the a-axis rotation in the X-Y plane. Higher translation speeds (up to about 250 inches per minute for each linear axis of X, Y, and Z, and up to about 20 rotations per minute for the a-axis rotation in the X-Y plane) may be incorporated to allow a larger process envelope in which control of the build height and width and deposition rates can be optimized for specific structural features and metallurgical characteristics. The mechanisms are covered with protective shielding to avoid contamination with condensed metal vapor from the electron beam freeform fabrication process. In addition, the positioning subsystem is thermally and electrically isolated from the process zone with a block of insulating material to protect it from the heat and electrical current generated by the electron beam. The insulating material is one means for providing thermal and electrical isolation. The positioning subsystem motors are vacuum-compatible and contained within the sealed container.

With continued reference to FIGS. 1, 2, and 3, in an embodiment, the multi-axes positioning subsystem 12 is connected structurally to the sealed container 10. In an embodiment, each axis (X, Y, Z linear axes and a-axis rotation in the X-Y plane for a four-axes system; plus an added tilt in either the X-Z or Y-Z planes for a 5-axes system) includes a drive unit (such as a stepper motor) (not shown) and translation mechanism (such as ball screws or worm gears) (not shown). The different axes are stacked such that the top of the moveable platform 14 (to which the substrate 32 is attached using clamps) is translated with respect to the electron beam. In an embodiment, each axis is powered and controlled independently, and can be operated simultaneously. In an embodiment, control of each axis is accomplished by an instrumentation subsystem (described later). In an embodiment, the positioning subsystem may further comprise encoding means for receiving positional data, transmitting positional data, interpreting positional data, or any combination. Electronic circuitry is one encoding means for receiving positional data, transmitting positional data, interpreting positional data, or any combination. Firmware is a second encoding means for receiving positional data, transmitting positional data, interpreting positional data, or any combination. Electrical power is provided to each independent axis in the positioning subsystem from the power distribution subsystem via at least one electrical feed-through 24 that penetrate through the wall of the sealed container 10.

A four-axes positioning subsystem is one positioning means for positioning a target to a predetermined location. A five-axes positioning subsystem is a second positioning means for positioning a target to a predetermined location. A multi-axes positioning subsystem up to seven moving axes is a third positioning means for positioning a target to a predetermined location. An articulating robotic arm is a fourth positioning means for positioning a target to a predetermined location. A worm gear positioning system is a fifth positioning means for positioning a target to a predetermined location In an embodiment, the deposition subsystem is a wire feed subsystem 13 comprised of at least one wire feed motor (providing tension on the wire and pulling or pushing the wire through the feeding mechanism) 48, a feeding mechanism 49, a straightening mechanism (not shown), a nozzle 33, an external wire feed controller 51, wire feed subsystem sensors (for measuring wire feed rate) (not shown), means for mounting a spool of wire (not shown), the wire spool containing a wire feed supply 46, and a wire feed housing 47 contained within the sealed container 10 and capable of accommodating the wire feed supply. In one embodiment, the nozzle may incorporate at least two orthogonal positioners for directing the wire precisely into the molten pool. The at least one wire feed motor and wire spool are contained within the sealed container 10 to eliminate damaging the wire feedstock feeding through the sealed container wall. The wire feed subsystem 13 is compact in size to locate it close to the process zone. In an embodiment, the feedstock supply is metal wire. Powdered metal feedstock requires gravity or flowing gas to direct the powder into the molten pool. For operating in a vacuum at microgravity, neither of these powder delivery methods will work. In addition, containment and handling of powdered metal poses significant safety issues in a microgravity environment. However, for terrestrial applications, the deposition subsystem may be a powder delivery subsystem. The use of wire feedstock eliminates the need for flowing gas and provides about 100% feedstock usage efficiency, resulting in the minimum mass and virtually no waste products. The wire feed subsystem 13 is capable of feeding very small diameter wires at both high and low speeds, enabling a range of deposition rates and fine detail to be achieved within this electron beam freeform fabrication system. In an embodiment, a plurality of wires may be fed from the wire feed subsystem. The wire feed subsystem 13 is vacuum compatible for location within the vacuum system close to the process zone. One-pound wire spools are preferred, but other spool sizes may also be used.

As stated earlier, for terrestrial applications, a powder delivery subsystem (not shown) may be used. This powder delivery subsystem includes at least one powder hopper or reservoirs external to the container, mechanical powder feed subsystem (such as a screw-driven feed subsystem), means for assisting constant powder flow (for example, inert flowing assist gas or vibrating gravity-fed lines), at least one powder delivery nozzle, powder feeder lines, inert gas cylinder and associated powder delivery plumbing and powder delivery subsystem circulation pumps, an external powder delivery controller, and powder delivery sensors (to measure flow rate and powder level in hopper).

In an embodiment, the wire feed subsystem 13 is structurally connected to the sealed container 10 either via direct structural attachment or via a mechanism that permits reorientation of the wire feed subsystem with respect to the electron beam gun 11. However, the wire feed subsystem might also be either mounted on that portion of the electron beam gun that protrudes into the sealed container—either via direct structural attachment or via a mechanism that permits reorientation of the wire feeder unit with respect to the electron beam gun. Power required to operate the wire feed motors (drive and tensioning) of the wire feed subsystem is supplied from the power distribution subsystem via the at least one electrical feed-through 24 that penetrates through the wall of the sealed container.

A wire feed subsystem is one delivery means for depositing feedstock material in a predetermined pattern and a predetermined rate onto a target location. A powder delivery subsystem is a second means for depositing feedstock material in predetermined pattern and a predetermined rate onto a target location.

In an embodiment, the instrumentation subsystem for the solid freeform fabrication apparatus is comprised of a means for measuring processing conditions (wherein instrumentation subsystem sensors is a means for measuring processing conditions), a means for recording data throughout the processing indexed on a common time scale (wherein a computer system with timing software and data storage capability is one means for recording data), and a means for commanding and controlling the fabrication process (wherein computer application software and a microprocessor is one means for commanding and controlling). In another embodiment, the instrumentation subsystem is further comprised of a means for monitoring a predetermined set of parameters related to the fabrication process (wherein computer application software is one means for monitoring) and a visual monitoring means for monitoring the fabrication process. In still another embodiment, the instrumentation subsystem is further comprised of a means for lighting and a means for networking (i.e., electronically interconnecting all of the aforementioned elements and subsystems). To perform all of the aforementioned elements, a plurality of instrumentation subsystem sensors as well as at least one camera (either video, still image, thermal image, or any combination) distributed throughout the various subsystems defined above are interconnected by a network (either wire, wireless, or both) with either central processing, distributed processing, or both and managed through at least one user interface displayed on a terminal or equivalent. A wire network is one means for networking. A wireless network is a second means for networking. In an embodiment, all of the controls and data acquisition are electronically managed through a user interface and display device (for example, a user interface display on a laptop monitor, desktop monitor, LCD, or any combination). In an embodiment, the sealed container is equipped with multiple viewing ports for mounting high speed and standard video cameras, thermal imaging cameras, still imaging cameras, or any combination to visually record the active process zone. In an embodiment, instrumentation subsystem sensors may comprise, for example, at least one accelerometer, at least one thermocouple, at least one pressure sensor, at least one current sensor, at least one voltage sensor, at least one deflection coil sensor, at least one focusing coil sensor, at least one rate sensor, at least one location sensor, at least one wire feed subsystem sensor, or any combination. In an embodiment, for testing and verification, at least one accelerometer is attached to the equipment to measure the gravitational forces and accelerations. In addition, in an embodiment, sealed container environmental parameters (for example, temperature), beam parameters (for example, current, voltage, deflection and focusing coil parameters, raster patterns), vacuum levels (for example, pressure level), rate and location parameters, and wire feeder control parameters (for example, rate, start, and stop) are recorded on the same time base to match with the process monitoring instrumentation outputs. Additional electrical feed-throughs are incorporated into the sealed container wall to allow implementation of other monitoring devices, such as thermocouples for measuring temperature, for future experiments. It is contemplated that the entire fabrication process is autonomous, while still allowing for manual interface by an operator as required. Commanding through a user interface on a computer is one of the means for commanding and controlling the fabrication process. Specifically, a human operator first evaluates an electron beam subsystem, wire feed subsystem, positioning subsystem, instrumentation subsystem, and vacuum subsystem operating parameters. Next, the operator makes the appropriate command inputs through the computer user interface and the control software makes the appropriate commands to the various subsystems and manages the process.

The solid freeform fabrication apparatus allows for adding capabilities for enhancing the process controls. Addition of the ability to change the orientation of the wire feed angle into the molten pool, extended part and beam manipulation capabilities, development of closed-loop controls and process automation, and the ability to build parts directly from computer-aided design (CAD) files may be incorporated.

Instrumentation is mounted both internal and external to the sealed container. In an embodiment, instrumentation that is mounted within the sealed container provides sensor signals to a computer system, or equivalent, via data lines that penetrate the sealed container wall via electrical feed-throughs 24. In another embodiment, instrumentation that is mounted within the sealed container provides sensor signals to an external PC computer, or equivalent, via a wireless network without the need for data lines. In an embodiment, power is supplied to the instruments within the sealed container from the power distribution subsystem 17 via at least one electrical feed-through 24 that penetrate through the wall of the sealed container 10. In an embodiment, instruments external to the sealed container provide signals to the computer system and receive electrical power from the power distribution subsystem 17.

An instrumentation subsystem is a command, control, and communications means for commanding, controlling, and providing communications for a delivery means, heating means, positioning means, and atmospheric pressure control means. At least one instrumentation subsystem sensor is a means for measuring processing conditions. A computer system with timing software and data storage is a data recording means for recording data throughout the processing indexed on a common time scale. Computer application software in combination with a computer system is a process monitoring means for monitoring a predetermined set of parameters related to the fabrication process. Computer application software in combination with a computer system is a command and control means for commanding and controlling the fabrication process. For example, command and control includes but is not limited to the process of supplying the coordinates and means to interpret movement of the positioning subsystem. Command and control also includes but is not limited to operating the deposition subsystem to supply feedstock material at a predetermined pattern and a predetermined rate. Video cameras in combination with a video monitoring system is one visual monitoring means for monitoring the fabrication process. Still cameras in combination with a still image monitoring system is a second visual monitoring means for monitoring the fabrication process. Thermal imaging cameras in combination with a thermal image monitoring system is a third visual monitoring means for monitoring the fabrication process. Video cameras in combination with a structured vision light system is a fourth visual monitoring means for monitoring the fabrication process. An incandescent light system is one means for lighting. A fluorescent light system is a second means for lighting. A structured vision light system is a third means for lighting. A high intensity discharge light system is a fourth means for lighting. A halogen light system is a fifth means for lighting. A light emitting diode system is a sixth means for lighting. An ultraviolet light system is a seventh means for lighting.

A power distribution subsystem is employed to apportion power to elements that require power. The power distribution subsystem comprises a means for providing an electrical connection, a means for conditioning power, a means for apportioning power, a means for distributing power, a means for protecting system components from electrical hazards, or any combination. All of the above means are well known in the art. In addition, the power distribution subsystem may include an uninterrupted power supply to allow auxiliary power for maintaining low power draw subsystems (such as for example, the at least one pump, various controllers, and computer) during times when access to power is not allowed. Further, the power distribution subsystem may include user interface monitor and control elements, such as for example, display elements and firmware. Still further, the power distribution subsystem may include a main power shutoff switch for emergency stops.

The power distribution subsystem may comprise a device that apportions input power received from available utility supplies to various loads. The power distribution subsystem may comprise transformers and rectifiers to change the voltage of utility power and to convert alternating current utility power to direct current power, as required. The power distribution subsystem may comprise appropriate safety devices such as circuit breakers or fuses to prevent overloading of circuits beyond rated capacities. In an embodiment, the power distribution subsystem is connected to utility power via a power cable and to the other various subsystems as described above.

As stated before, elements of a power distribution subsystem are well known in the art. Examples are provided in this paragraph. An electrical cable is one means for providing an electrical connection. An electrical connector is a second means for providing an electrical connection. A regulator is one means for conditioning power. A converter is a second means for conditioning power. A charge controller is a third means for conditioning power. A capacitor is a fourth means for conditioning power. A rectifier is a fifth means for conditioning power. A transformer is a sixth means for conditioning power. A power management system is a means for apportioning power. A power bus is a means for distributing power. A switch is a second means for distributing power. A circuit breaker is a means for protecting system components from electrical hazards. A fuse is a second means for protecting system components from electrical hazards.

A power distribution subsystem is a power distribution means for distributing power to a delivery means, a positioning means, a heating means, an atmospheric pressure control means, and a command, control, and communications means.

In accordance with the various embodiments of the solid freeform fabrication apparatus described above, methods for use are provided. These methods for use provide a three-dimensional solid object directly by the controlled deposition of material in a layer-by-layer manner on a substrate.

The following describes an embodiment of a method for use. The solid freeform fabrication apparatus is prepared by affixing a substrate material on the positioning subsystem contained in the sealed container and ensuring the wire feed subsystem has an appropriate amount of feedstock material. If additional feedstock material is required, loading the wire feed subsystem with a proper amount of feedstock material is accomplished. The work environment inside the sealed container is prepared by evacuating gas inside the sealed container such that the resulting pressure inside the sealed container reaches a predetermined level. Preparation of the work environment inside the sealed container may include closing all access areas such as doors and ensuring a proper seal. The evacuation is accomplished by the vacuum subsystem described above. The vacuum subsystem also provides maintenance of the desired pressure inside the sealed container. Active monitoring and verification of the pressure inside the sealed container is constantly performed. The wire feed subsystem ejects the feedstock material in a synchronized manner with the positioning subsystem to a predetermined target location. The predetermined target location is determined relative to the substrate. The electron beam gun as part of the electron beam subsystem is activated and creates as well as sustains a molten pool in the substrate or previous deposition. In addition, the electron beam gun preheats the feedstock material, nearly to melting. The electron beam gun works in concert with the wire feed subsystem and the positioning subsystem. The wire feed subsystem supplies the wire feedstock material into the molten pool. In addition, the wire feed subsystem controls the wire feedstock's distance from the target location. The optimum operational location is when the wire feedstock is melting in the center of the electron beam emitted from the electron beam gun and is in direct contact with the molten pool at the same point in space. Feedback, command and control functions are continuously carried out by the instrumentation subsystem. The instrumentation system accepts a solid-model representation of a predetermined three-dimensional object. The instrumentation subsystem controls the positioning subsystem, wire feed subsystem, and electron beam gun in a manner to section the object geometry into a finite number of slices and plots the deposition path required to achieve each layer of the object as a whole. The instrumentation subsystem also controls the vacuum subsystem for maintenance of the desired environment inside the sealed container. Further, the instrumentation subsystem monitors all sensor inputs which relay information on the various operating parameters and maintains correct operating parameters such as pressures, temperatures, voltages, and the like. This process of deposition, positioning, and heating, controlled by the instrumentation subsystem and performed by the wire feed subsystem, positioning subsystem, and electron beam gun, respectively, is continuously repeated thereby forming the three dimensional object.

In another embodiment, the method described above may include in the following steps. The method described above may include creating an input data file. Creation of an input data file is accomplished by one of two means. First, creation of an input data file may be accomplished by creating a mathematical model (e.g., via computer-aided design, CAD), which is a data representation of a three dimensional object. In addition, a tool path file is generated from the mathematical model. Second, creation of an input data file may be accomplished by manually developing program commands to build a simple three dimensional object. Additional steps may include: downloading the input data file to the instrumentation subsystem; checking the wire feedstock supply and replacing the wire feedstock supply if necessary; zeroing all drives on the positioning subsystem to return to "home" position; initiating sensors, cameras, and other processing monitoring equipment; synchronizing time between the instrumentation subsystem element such as a computer system, at least one camera, at least one sensor, and various subsystem control elements; initiating data acquisition of predetermined process parameters; preheating and cleaning the substrate by running a reduced power electron beam over a first programmed layer path without feeding the wire feedstock; retracting the wire feedstock, turning the electron beam gun off, and stopping the positioning subsystem motion off after each deposition layer.

What is claimed is:

1. An apparatus for formation of a three dimensional object by a sequential deposition of a wire feedstock comprising:
   a sealed container capable of maintaining a vacuum environment;
   a positioning subsystem contained within said container and capable of controlling the position of said object;
   a wire feed subsystem contained within said container and capable of depositing said wire feedstock in solid form at a target location relative to said position of said object in a sequential manner;
   an electron beam subsystem capable of directing energy within said container, directing energy to said target location, melting said wire feedstock at said target location consistent with said sequential deposition of said wire feedstock, and sustaining a molten pool at said target location thereby forming said object in said sequential manner;
   a vacuum subsystem capable of creating and sustaining said vacuum environment in said container;
   an instrumentation subsystem electronically connected to said electron beam subsystem, positioning subsystem, wire feed subsystem, and vacuum subsystem; and
   a power distribution subsystem electrically connected to said electron beam subsystem, positioning subsystem, wire feed subsystem, vacuum subsystem, and said instrumentation subsystem.

2. The apparatus of claim 1, further comprising a substrate attached to said positioning subsystem wherein said sequential deposition of said wire feedstock is initiated on said substrate.

3. The apparatus of claim 1, wherein said container is comprised of:
   a frame; and
   at least one wall attached to said frame.

4. The apparatus of claim 3, wherein said frame and at least one wall is formed of a material selected from a group consisting of metal, metal alloy, ceramic, ceramic composite, metal matrix composite, and polymer matrix composite.

5. The apparatus of claim 3, wherein said frame and at least one wall is formed of a material selected from the group consisting of titanium, aluminum, aluminum alloys, beryllium alloys and stainless steel.

6. The apparatus of claim 3, where said container is further comprised of:
   at least one window attached to said at least one wall;
   at least one door attached to said frame, to said wall, or both;
   at least one electrical feed-through attached to said at least one wall; and
   at least one plumbing feed-through attached to said at least one wall.

7. The apparatus of claim 6, wherein said window is formed of a transparent material.

8. The apparatus of claim 6, wherein said at least one door is formed of a material selected from a group consisting of metal, metal alloy, ceramic, and ceramic composite.

9. The apparatus of claim 1, wherein said container has a rectilinear, ellipsoidal, or arbitrary cross-sectional shape.

10. The apparatus of claim 1, wherein said electron beam subsystem is comprised of:
    an electron beam gun capable of directing said energy;
    an electron beam control element capable of controlling the delivery of said energy from said electron beam gun and electronically connected to said instrumentation subsystem and said electron beam gun; and
    an electron beam power subsystem electrically connected to said electron beam gun and said electron beam control element and wherein said electron beam power subsystem is capable of supplying power to said electron beam gun and said electron beam control element.

11. The apparatus of claim 10, wherein said electron beam subsystem is further comprised of:
    at least one auxiliary vacuum pump connected to said electron beam gun, electrically connected to said power distribution subsystem, and capable of creating and sustaining a vacuum level within said electron beam gun;
    at least one service panel attached to said electron beam gun and electrically connected to said power distribution subsystem; and
    at least one user interface screen electronically connected to said electron beam control element and electrically connected to said power distribution subsystem.

12. The apparatus of claim 11, wherein said electron beam subsystem is further comprised of an electron beam positioning subsystem capable of positioning said electron beam gun relative to said position of said object wherein said electron beam positioning subsystem is electronically connected to said electron beam control element and electrically connected to said power distribution subsystem.

13. The apparatus of claim 11, wherein said electron beam subsystem is further comprised of an electron beam positioning subsystem capable of positioning said electron beam gun relative to said position of said object wherein said electron beam positioning subsystem is electronically connected to said instrumentation subsystem and electrically connected to said power distribution subsystem.

14. The apparatus of claim 10, wherein said electron beam power subsystem is rated at a voltage range from about 100V to about 240V.

15. The apparatus of claim 14, wherein said electron beam power subsystem is rated at about 110V.

16. The apparatus of claim 10, wherein said electron beam gun is partially contained inside said container.

17. The apparatus of claim 10, wherein said electron beam power subsystem is rated to provide an accelerating voltage up to about 60 kV.

18. The apparatus of claim 17, wherein said electron beam power subsystem is rated to provide an accelerating voltage up to about 15 kV.

19. The apparatus of claim 10, wherein said electron beam power subsystem is rated to provide a beam power from about 3 kW to about 10 kW.

20. The apparatus of claim 19, wherein said electron beam power subsystem is rated to provide a beam power from about 3 kW to about 5 kW.

21. The apparatus of claim 1, wherein said positioning subsystem is comprised of:
    a moveable platform contained within said container;
    at least one positioning subsystem motor capable of moving said moveable platform and electrically connected to said power distribution subsystem; and
    a positioning subsystem control element capable of controlling said position of said object, wherein said positioning subsystem control element is electronically connected to said instrumentation subsystem, said moveable platform, and said at least one positioning subsystem motor, and wherein said positioning subsystem control element is electrically connected to said power distribution subsystem.

22. The apparatus of claim 21, wherein said moveable platform is a four axes moveable platform.

23. The apparatus of claim 22, wherein said positioning subsystem control element is rated to control said four axes moveable platform within about +/−0.001 for each linear axis of X, Y, and Z and about 0.01 degrees for the a-axis of rotation in the X-Y plane.

24. The apparatus of claim 22, wherein said positioning subsystem control element is rated to control said four axes moveable platform within a translational speed up to about 250 inches per minute for each linear axis of X, Y, and Z and a rotational speed up to about 20 rotations per minute for the a-axis of rotation in the X-Y plane.

25. The apparatus of claim 24, wherein said positioning subsystem control element is rated to control said four axes moveable platform within a translational speed up to about 50 inches per minute for each linear axis of X, Y, and Z and a rotational speed up to about 10 rotations per minute for the a-axis of rotation in the X-Y plane.

26. The apparatus of claim 21, wherein said moveable platform is a five axes moveable platform.

27. The apparatus of claim 1, wherein said wire feed subsystem is comprised of:
said wire feedstock;
a wire feed housing contained within said container and capable of accommodating said wire feedstock;
at least one wire feed motor attached to said wire feed housing and electrically connected to said power distribution subsystem;
a wire feeding mechanism attached to said wire feed housing, mechanically connected to said wire feed motor, and wherein said wire feedstock is threaded through said wire feeding mechanism;
at least one wire feed nozzle attached to said wire feed housing and wherein said wire feedstock is fed through said wire feed nozzle; and
a wire feed control element electronically connected to said instrumentation subsystem, said wire feed motor, said wire feeding mechanism, and said at least one wire feed nozzle and electrically connected to said power distribution subsystem.

28. The apparatus of claim 1, wherein said vacuum subsystem is comprised of:
a plumbing subsystem connected to said container;
at least one pump connected to said plumbing subsystem and capable of creating and sustaining said vacuum environment in said container; and
a vacuum control element electrically connected to said power distribution subsystem, electronically connected to said instrumentation subsystem, and capable of controlling said at least one pump and said plumbing subsystem.

29. The apparatus of claim 28, wherein said plumbing subsystem, said at least one pump, and said vacuum control element are capable of creating and sustaining a pressure from about $10^{-4}$ torr to about $10^{-6}$ torr in said container.

30. The apparatus of claim 28, wherein said at least one pump is selected from a group consisting of a turbomolecular pump, a scroll pump, an ion pump, a roughing pump, a cryopump, and a diffusion pump.

31. The apparatus of claim 28, wherein said vacuum control element is comprised of at least one vacuum subsystem sensor electronically connected to said instrumentation subsystem, said at least one pump, and said plumbing subsystem.

32. The apparatus of claim 1, wherein said instrumentation subsystem is comprised of:
a means for commanding and controlling data electrically connected to said power distribution subsystem and electronically connected to said electron beam subsystem, positioning subsystem, wire feed subsystem, and vacuum subsystem;
a means for measuring processing conditions electronically connected to said means for commanding and controlling data; and
a means for recording data electronically connected to said means for commanding and controlling data.

33. The apparatus of claim 1, wherein said instrumentation subsystem is further comprised of:
a visual monitoring means for monitoring the fabrication process electronically connected to the means for commanding and controlling data; and
a means for monitoring a predetermined set of parameters related to the fabrication process electronically connected to the means for commanding and controlling data.

34. The apparatus of claim 1, wherein said power distribution subsystem is comprised of:
a means for providing an electrical connection electrically connected to said electron beam subsystem, positioning subsystem, wire feed subsystem, vacuum subsystem, and said instrumentation subsystem;
a means for conditioning power electrically connected to said means for providing an electrical connection;
a means for apportioning power electrically connected to said means for providing an electrical connection;
a means for distributing power electrically connected to said means for providing an electrical connection; and
a means for protecting system components from electrical hazards electrically connected to said means for providing an electrical connection.

35. The apparatus of claim 34, wherein said power distribution subsystem further comprises a means for managing power electrically connected to said means for electrical connection.

36. An apparatus for formation of a three dimensional object by a sequential deposition of a wire feedstock comprising:
a sealed container capable of maintaining a vacuum environment;
a positioning subsystem contained within said container and capable of controlling the position of said object;
an electron beam subsystem capable of directing energy within said container and directing energy to said target location;
a wire feed subsystem contained within said electron beam subsystem and capable of depositing said wire feedstock in solid form to a target location relative to said position of said object in a sequential manner;
a vacuum subsystem connected to said container and capable of creating and sustaining said vacuum environment in said container;
an instrumentation subsystem electronically connected to said electron beam subsystem, positioning subsystem, wire feed subsystem, and vacuum subsystem; and
a power distribution subsystem electrically connected to said electron beam subsystem, positioning subsystem, wire feed subsystem, vacuum subsystem, and said instrumentation subsystem, wherein said electron beam subsystem is capable of melting said wire feedstock at said target location consistent with said sequential deposition of said wire feedstock, sustaining a molten pool at said target location thereby forming said object in said sequential manner.

37. An apparatus for formation of a freeform three dimensional object comprising:

a containment means for enclosing a workspace;

a delivery means contained within said containment means and for depositing a feedstock material in a solid form, in a predetermined pattern, and a predetermined rate onto a target;

a positioning means contained within said containment means and for positioning said target to a predetermined location;

an electron beam subsystem capable of directing energy within said container and directing energy relative to said target and melting said feedstock at said target location and sustaining a molten pool at said target location thereby forming said object consistent with said predetermined pattern and at said predetermined rate;

an atmospheric pressure control means connected to said containment means and for creating and maintaining a vacuum environment inside said containment means;

a command, control, and communications means electronically connected to said containment means, electronically connected to said delivery means, electronically connected to said heating means, electronically connected to said positioning means, electronically connected to said atmospheric control means, and for commanding, controlling, and providing communications for said delivery means, said heating means, said positioning means, and said atmospheric pressure control means; and a power distribution means electrically connected to said delivery mean, said heating means, said positioning means, said atmospheric control means, and said command, control, and communications means and for distributing power to said delivery means, said positioning means, said heating means, said atmospheric pressure control means, and said command, control, and communications means.

38. An apparatus for formation of a three dimensional object in interplanetary space by a sequential deposition of a wire feedstock comprising:

a frame;

a positioning subsystem attached to said frame and capable of controlling the position of said object;

a wire feed subsystem attached to said frame and capable of depositing said wire feedstock in a solid form relative to a target location relative to said position of said object in a sequential manner;

an electron beam subsystem capable of directing energy relative to said position of said object, melting said wire feedstock at said target location consistent with said sequential deposition of said wire feedstock, and sustaining a molten pool at said target location thereby forming said object in said sequential manner;

an instrumentation subsystem electronically connected to said electron beam subsystem, positioning subsystem, and wire feed subsystem; and a power distribution subsystem electrically connected to said electron beam subsystem, positioning subsystem, wire feed subsystem, and said instrumentation subsystem.

\* \* \* \* \*